(12) United States Patent
Haller

(10) Patent No.: US 7,895,840 B2
(45) Date of Patent: Mar. 1, 2011

(54) EXHAUST GAS DIFFUSER WALL CONTOURING

(75) Inventor: Brian Haller, Panton (GB)

(73) Assignee: Siemens Aktiengesellschaft, Munich (DE)

( * ) Notice: Subject to any disclaimer, the term of this patent is extended or adjusted under 35 U.S.C. 154(b) by 1092 days.

(21) Appl. No.: 11/631,052

(22) PCT Filed: Jun. 9, 2005

(86) PCT No.: PCT/EP2005/052673
§ 371 (c)(1), (2), (4) Date: Dec. 28, 2006

(87) PCT Pub. No.: WO2006/003071
PCT Pub. Date: Jan. 12, 2006

(65) Prior Publication Data
US 2009/0191052 A1    Jul. 30, 2009

(30) Foreign Application Priority Data
Jul. 2, 2004  (GB) .................................. 0414846.6

(51) Int. Cl.
*F02C 1/00* (2006.01)
*F02G 3/00* (2006.01)

(52) U.S. Cl. ....................................... 60/751; 415/208.2

(58) Field of Classification Search ............... 415/208.2, 415/208.3, 208.4, 211.1, 211.2, 224.5, 914
See application file for complete search history.

(56) References Cited

U.S. PATENT DOCUMENTS

| | | | |
|---|---|---|---|
| 3,625,630 A | 12/1971 | Soo | |
| 5,152,661 A | 10/1992 | Sheets | |
| 5,203,674 A * | 4/1993 | Vinciguerra | 415/211.2 |
| 5,257,906 A * | 11/1993 | Gray et al. | 415/226 |
| 5,494,405 A * | 2/1996 | Gray et al. | 415/211.2 |
| 5,524,827 A | 6/1996 | Znamensky et al. | |
| 6,261,055 B1 * | 7/2001 | Owczarek | 415/148 |
| 6,488,470 B1 * | 12/2002 | Owczarek | 415/148 |
| 6,733,238 B2 * | 5/2004 | Hiyama et al. | 415/211.2 |
| 6,866,479 B2 * | 3/2005 | Ishizaka et al. | 415/209.1 |
| 7,062,918 B2 * | 6/2006 | Walker et al. | 60/751 |
| 7,197,882 B2 * | 4/2007 | Marnas et al. | 60/796 |
| 2002/0159886 A1 * | 10/2002 | Hiyama et al. | 415/207 |
| 2007/0081892 A1 * | 4/2007 | Sharrow | 415/211.2 |
| 2009/0068006 A1 * | 3/2009 | Hardin | 415/211.2 |

FOREIGN PATENT DOCUMENTS

GB    623108    5/1949

OTHER PUBLICATIONS

Arthur H. Lefebvre, Gas Turbine Combustion, 1999, Taylor and Francis, Second edition, pp. 72-80.*

* cited by examiner

*Primary Examiner* — William H Rodríguez

(57) ABSTRACT

A diffuser for diffusing the exhaust gas produced by an engine, said diffuser comprising a wall or walls defining sections of the diffuser, said diffuser comprising: an initial section which extends for substantially one third the length of the diffuser, at the entry to said initial section the shape factor of the boundary layer flow at the or each wall of the section being in the range 1.3 to 1.6, said initial section being configured so as to substantially linearly increase said shape factor so that at the exit of said initial section said shape factor is in the range 1.6 to 2.2; and a main section following the initial section and extending for the remaining length of the diffuser, said main section being configured so as to maintain said shape factor in the range 1.6 to 2.2 over the length of the main section.

10 Claims, 4 Drawing Sheets

| rhub mm | rtip mm | xhub mm | xtip mm | xhub_mod mm | xtip_mod mm | rhub/H | rtip/H | xhub_mod/H | xtip_mod/H |
|---|---|---|---|---|---|---|---|---|---|
| 232.1 | 369.1 | 169.4 | 156.5 | 12.9 | 0 | 1.694161 | 2.694161 | 0.09416058 | 0 |
| 271.0149 | 470 | 510 | 510 | 353.5 | 353.5 | 1.978211 | 3.430657 | 2.58029197 | 2.580292 |
| 309.8612 | 540 | 850 | 850 | 693.5 | 693.5 | 2.261761 | 3.941606 | 5.0620438 | 5.062044 |
| 349.85 | 597 | 1200 | 1200 | 1043.5 | 1043.5 | 2.55365 | 4.357664 | 7.61678832 | 7.616788 |
| 388 | 650 | 1534 | 1534 | 1377.5 | 1377.5 | 2.832117 | 4.744526 | 10.0547445 | 10.05474 |

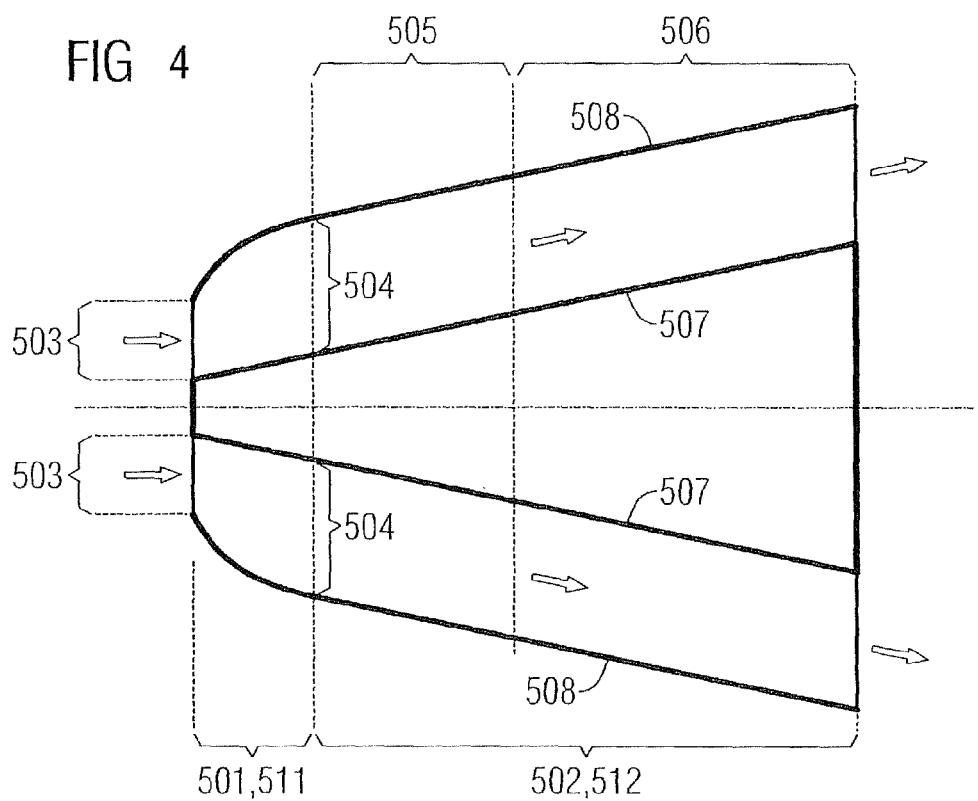
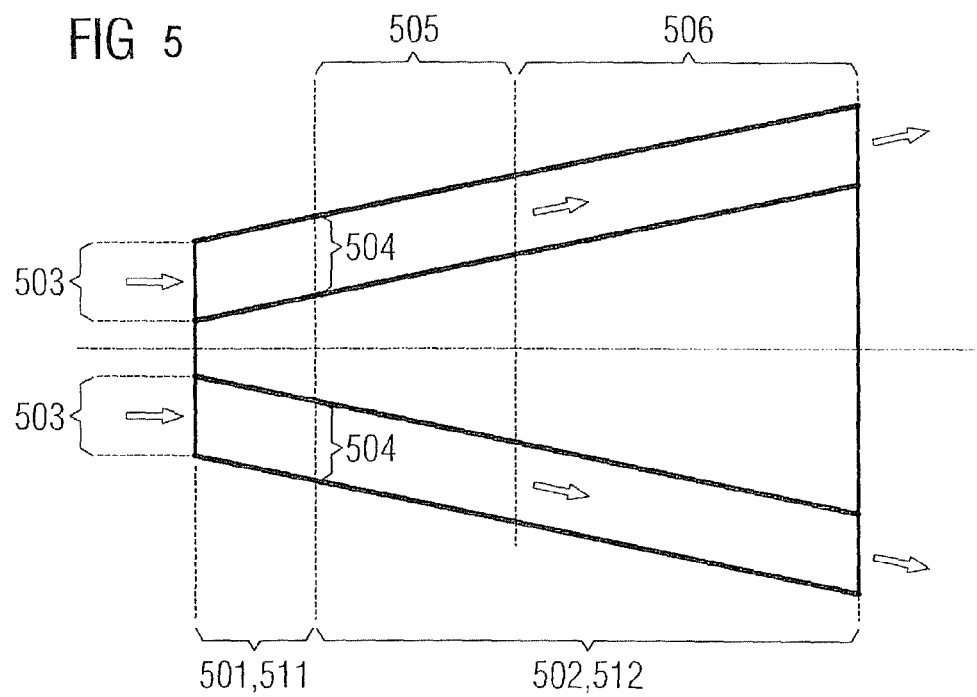

EXHAUST GAS DIFFUSER WALL CONTOURING

CROSS REFERENCE TO RELATED APPLICATIONS

This application is the US National Stage of International Application No. PCT/EP2005/052673, filed Jun. 9, 2005 and claims the benefit thereof. The International Application claims the benefits of British Patent application No. 0414846.6 filed Jul. 2, 2004. All of the applications are incorporated by reference herein in their entirety.

FIELD OF INVENTION

This invention relates to a diffuser for diffusing the exhaust gas produced by an engine.

The invention finds particular application in an annular diffuser as may be used for an exhaust duct of a gas turbine engine.

BACKGROUND OF THE INVENTION

A diffuser is a device used to increase static pressure of a working fluid and it does so by decreasing the fluid kinetic energy. The amount of energy thus saved is, through the increase in pressure, able to do work elsewhere. For example, in a gas turbine an increase in pressure ratio across a turbine section will result in more work done by the turbine.

An increase in static pressure in an exhaust duct may be achieved simply by progressively increasing the cross-sectional area of the duct in the fluid flow direction, expanding the fluid. However, the flow behaviour of such expanded fluid is dependent on several factors and not easily predicted to the extent there is no recognised best method of establishing an optimum diffuser profile for a given situation. For a given turbine, different engineers are likely to come up with different diffuser profile designs, each having different performance characteristics.

One factor generally regarded of importance is boundary layer separation. When the fluid next to a diffuser wall (the boundary layer) becomes turbulent and separates from the wall there is a loss in diffusing area and pressure recovery is reduced, i.e. the diffuser performance is degraded. Effectively, wherever the flow separates in a diffuser the static pressure (and hence recovery) is fixed at that point, i.e. diffuser exhaust pressure equals static pressure at the separation point. It is well known that wider angles of divergence in a diffuser encourage flow separation whereas smaller angles do not.

A conservative approach to the flow separation problem will generally result in a diffuser of small divergence angle and relatively long length. However, a long diffuser has disadvantage in that where it is part of a gas turbine engine it makes the engine design more complicated and expensive. Also, the length of an engine may be of significant importance for example on an oil platform at sea where available space is limited.

The opposite, aggressive approach, to diffuser design may provide a greater divergence angle and be shorter in length but may suffer in terms of best performance.

SUMMARY OF INVENTION

It is an objective of the present invention to provide a diffuser profile that optimises performance and length.

According to a first aspect of the present invention there is provided a diffuser for diffusing the exhaust gas produced by an engine, said diffuser comprising a wall or walls defining sections of the diffuser, said diffuser comprising: an initial section which extends for substantially one third the length of the diffuser, at the entry to said initial section the shape factor of the boundary layer flow at the or each wall of the section being in the range 1.3 to 1.6, said initial section being configured so as to substantially linearly increase said shape factor so that at the exit of said initial section said shape factor is in the range 1.6 to 2.2; and a main section following the initial section and extending for the remaining length of the diffuser, said main section being configured so as to maintain said shape factor in the range 1.6 to 2.2 over the length of the main section.

According to a second aspect of the present invention there is provided a diffuser suitable for diffusing the exhaust gas produced by a gas turbine engine, said diffuser being of annular form and comprising inner and outer annular walls defining sections of the diffuser, said diffuser comprising a first section and a second section following the first section, wherein the rate of increase of the cross-sectional area of the diffuser is greater in said first section than it is in said second section.

BRIEF DESCRIPTION OF THE DRAWING

The invention will now be described, by way of example, with reference to the accompanying drawings, in which:

FIG. 4 is a diffuser with a concave outer wall; and

FIG. 5 is a diffuser with a concave inner wall.

DETAILED DESCRIPTION OF INVENTION

Figure 1:
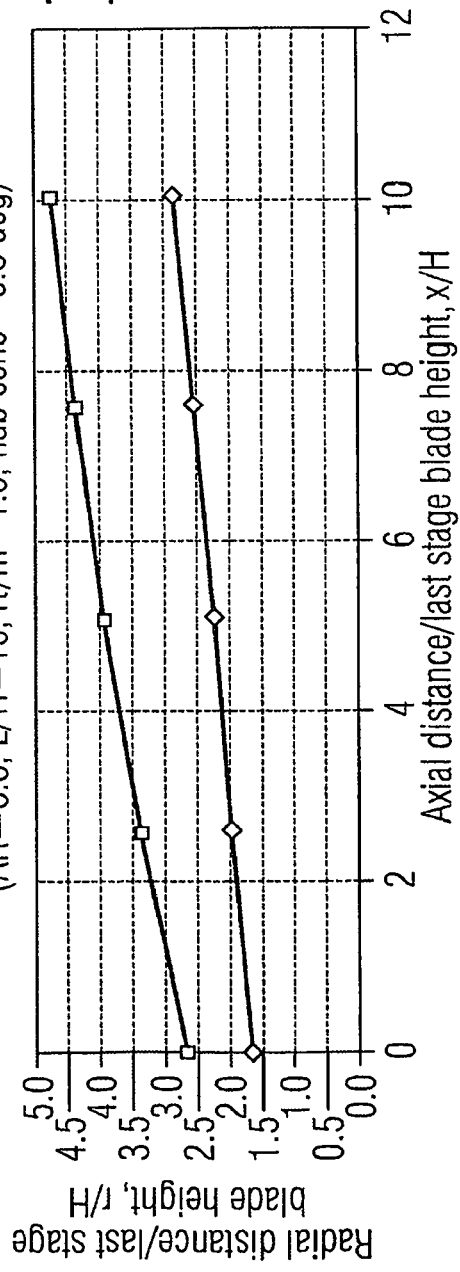
FIG. 1 is a table and associated graph defining a gas turbine engine annular diffuser in accordance with the present invention.

The invention focuses on a particular factor that characterises fluid boundary layer condition and which may be used to indicate the point of separation of a fluid from a surface. This factor is known as Shape Factor (H) and is defined as boundary layer displacement thickness divided by momentum thickness.

There is no prior art agreed accurate figure for H to say when boundary layer separation actually occurs, merely a broad range is indicated. For example, a thesis by Kristian Angele 'Experimental studies of turbulent boundary layer separation and control' KTH Mechanics, S-100 44 Stockholm, Sweden offers in chapter 6, variously H=3.3, H=2.35 and H=2.85.

It has been appreciated that broadly there is an advantage in a shape factor range and distribution for a diffuser whereby:

(i) At the diffuser entry H is in the range 1.3 to 1.6.

(ii) There is an approximately linear increase in H from the entry until a point approximately one third length of the diffuser 500 from the entry (the initial section) 503 at which point H is in the range 1.6 to 2.2.

(iii) From the end of the initial section 504 and for the remaining effective length of the diffuser (the main section) 500 H is in the range 1.6 to 2.2.

More specifically it has been appreciated that there is particular advantage in a shape factor range and distribution whereby:—

(i) At the diffuser entry 503 H is in the range 1.3 to 1.6.

(ii) There is an approximately linear increase in H from the entry until a point approximately one third length of the diffuser 500 from the entry (the initial section) 503 at which point H is in the range 1.6 to 2.1.

(iii) From the end of the initial section 504 and for a distance of one half the remaining effective length of the diffuser 500 (the second section) H is in the range 1.6 to 2.1.

(iv) From the end of the second section and for the remaining effective length of the diffuser 500 (the third section) H is in the range 1.6 to 2.2.

The lower value of H described at diffuser entry is found desirable in order that a stable boundary layer may become quickly established.

As previously stated, there are many methods to choose from when designing a diffuser 500. In the case of the present invention it is preferred to assess the fluid flow characteristics of the diffuser using an axisymmetric streamline curvature throughflow method coupled to an axisymmetric boundary layer method, the results of which are checked in a three dimensional (3D) Navier Stokes calculation. The method is run iteratively until the desired H values are obtained over the whole of the diffuser 500 thus presenting a diffuser wall profile which gives superior performance for any given diffuser length. Naturally for an annular diffuser the values for H must be achieved at both the inner and outer annular diffuser walls 507, 508.

Figure 2:
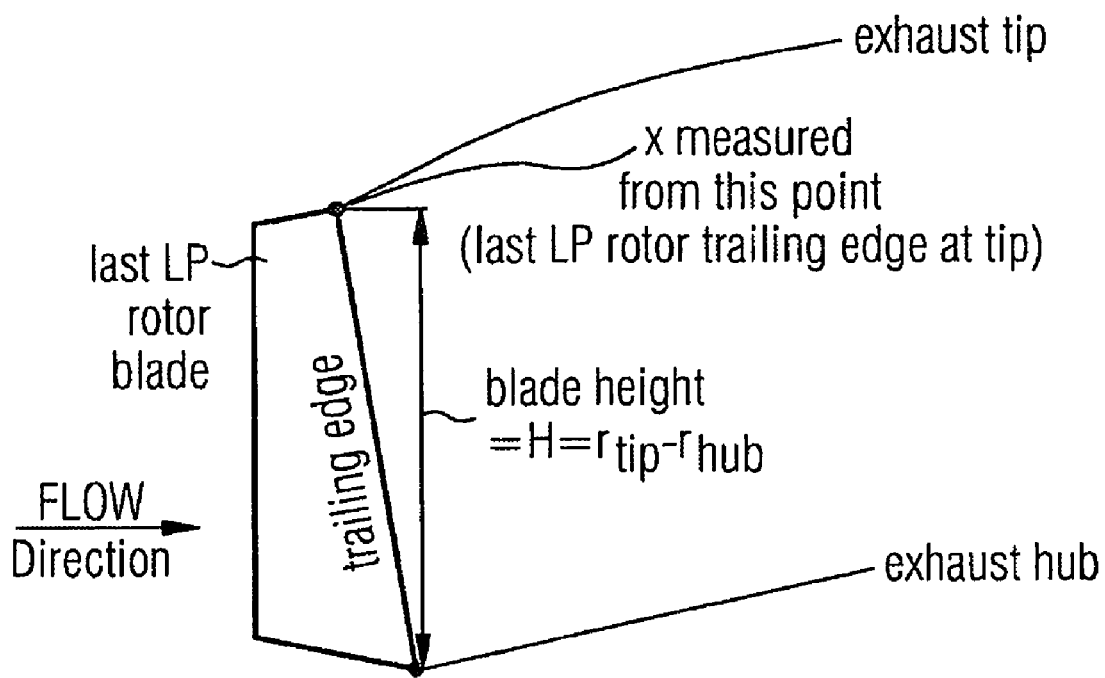
FIG. 2 is a schematic illustration of the diffuser of FIG. 1 and shows the geometrical dimensions used in the table/graph of FIG. 1.
Figure 2:
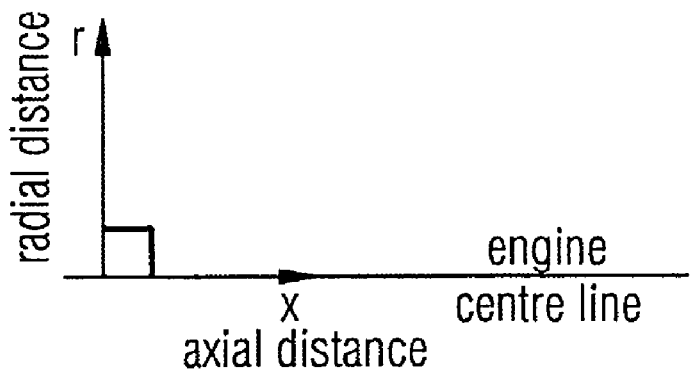

The diffuser 500 of FIGS. 1 and 2 and shown in FIG. 4, has been designed using the aforesaid preferred method. In FIGS. 1 and 2 "hub" refers to the inner annular wall 507 and "tip" refers to the outer annular wall 508. The first and third columns of the table of FIG. 1 contain axial x and radial r coordinate pairs defining the position of the inner annular wall 507. As can be seen from FIG. 2: the axial distance x is measured from the tip of the trailing edge of the last low pressure (LP) rotor blade of the gas turbine engine; and the radial distance r is measured from the axis of the annular diffuser (also the centre line of the engine). The second and fourth columns of the table contain axial x and radial r coordinate pairs defining the position of the outer annular wall. The fifth column of the table headed xhub_mod contains the values of the third column headed xhub after subtraction from each of these values of the first value 156.5 of the fourth column xtip. Similarly, the sixth column headed xtip_mod contains the values of the fourth column headed xtip after subtraction from each of these values of the first value 156.5 of the fourth column xtip. The seventh to tenth columns contain the values of the first, second, fifth and sixth columns respectively after division of each of these values by the height H of the last LP rotor blade as shown in FIG. 2 (H equals 137 mm). The graph of FIG. 1 is plotted using the coordinates of the seventh to tenth columns of the table.

Figure 3:
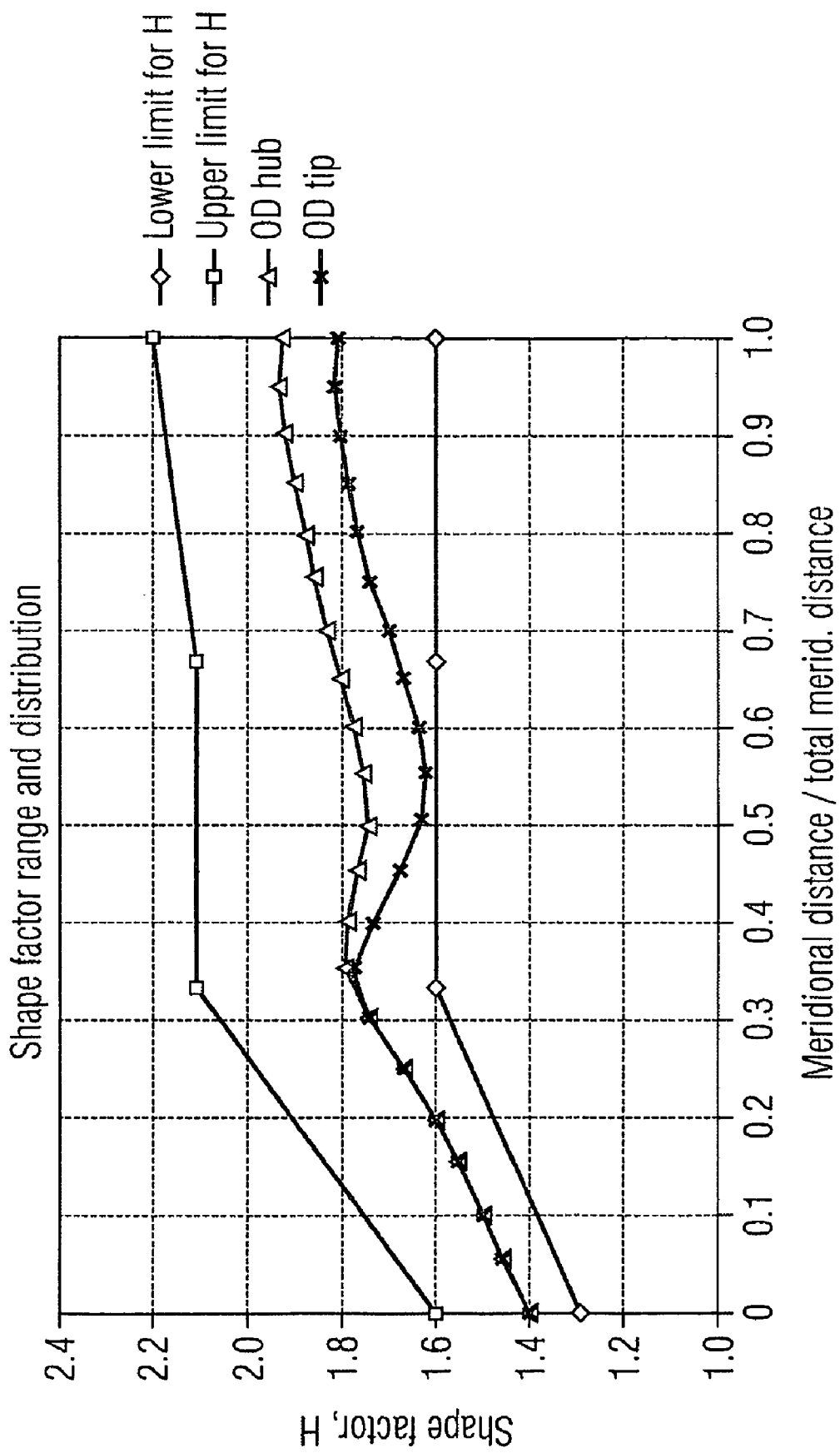
FIG. 3 is a graph of shape factor range and distribution for an annular diffuser in accordance with the present invention.

The graph of FIG. 3 contains four plots. The "Lower limit for H" and "Upper limit for H" plots correspond to the more specific diffuser shape factor range and distribution given above. The optimised diffusion "OD hub" and "OD tip" plots illustrate shape factor behaviour of the inner and outer annular walls respectively of an annular diffuser in accordance with the present invention. It is to be noted that this behaviour is within the ranges of the aforesaid more specific diffuser shape factor range and distribution.

The present invention achieves a relatively low exit velocity (high pressure recovery) over a relatively short length. It does this by making use of a relatively low shape factor H present at diffuser entry. As H is low initial diffusion may be more aggressive without risk of fluid separation. Thus, the rate of increase of the cross-sectional area of the diffuser (and hence expansion of the fluid) may initially be relatively rapid. As H increases this rate of increase of cross-sectional area is reduced to avoid separation. The diffuser can therefore be considered to comprise two general sections: a first section 501 over which the rate of increase of cross-sectional area is relatively rapid (and hence diffusion more aggressive); and a second section 502 over which the rate of increase of cross-sectional area is relatively slow (and hence diffusion less aggressive).

In the diffuser 500 of FIG. 1, shown in FIG. 4, the relatively fast followed by relatively slow increase in cross-sectional area is achieved by the form of the outer annular wall 508. The outer annular wall 508 is generally concave and curves towards the inner annular wall 507. The inner annular wall 507 is conical in form. It is to be understood that if both the inner and outer annular walls 507,508 were conical in form then the rate of increase in cross-sectional area would not vary from diffuser entry to diffuser exit. By the concave form of the outer wall 508 the relatively fast followed by relatively slow increase in cross-sectional area is achieved. It is of course the case that the same effect could be achieved by an outer annular wall that is conical in form and an inner annular wall that is generally concave and curves towards the outer wall, shown in FIG. 5.

In the diffuser 500 of FIG. 1, shown in FIG. 4, at the entry to the diffuser the ratio of the radius of the outer annular wall 508 to the radius of the inner annular wall 507 is 1.6. Use of the above mentioned preferred diffuser design method suggests that this ratio may be varied within the range 1.4 to 1.8. Similarly, the L/H of the diffuser 500 of FIG. 1 is 10, where L is the total axial length of the diffuser, and H is as above as shown in FIG. 2. Use of the design method suggests that the L/H may be varied within the range 7 to 12. Further, in the diffuser 500 of FIG. 1 the angle between the conical inner annular wall 507 and the axis of the annular diffuser is 6.5 degrees. Use of the design method suggests that this angle may be varied within the range 5 to 15 degrees. In the diffuser 500 of FIG. 1 the ratio of the cross-sectional area of the diffuser at diffuser entry to diffuser exit is 3.3. Use of the design method suggests that this ratio may range up to 3.5.

The invention claimed is:

1. A diffuser for diffusing an exhaust gas produced by a gas turbine engine, comprising:

an inner annular wall defining sections of the diffuser, where the sections comprise a first section and a second section following the first section, wherein the rate of increase of a cross-sectional area of the diffuser, which includes using an outer annular wall as an outer boundary and the inner annular wall as an inner boundary, in a direction of fluid flow is greater in the first section than it is in the second section; and the outer annular wall coaxially aligned and surrounding the annular inner wall, wherein the inner annular wall diverges away from an axis of the gas turbine engine, and wherein the diffuser diffuses the exhaust has produced by the gas turbine engine.

2. The diffuser according to claim 1, wherein the inner annular wall is conical and the outer annular wall is concave curving toward the inner annular wall.

3. The diffuser according to claim 2, wherein at the entry to the first section of the diffuser the ratio of the radius of the outer annular wall to the radius of the inner annular wall is between 1.4 to 1.8.

4. The diffuser according to claim 3, wherein the diffuser L/H ratio is between 7 to 12, where L is the total length of the diffuser along the axis of the inner and outer annular walls, and H is the distance between the inner and outer annular walls at entry to the diffuser in a direction perpendicular to the axis.

5. The diffuser according to claim 4, wherein the angle between the conical inner annular wall and the axis of the inner and outer annular walls is between 5 to 15 degrees.

6. The diffuser according to claim 5, wherein the ratio of the cross-sectional area of the diffuser at entry to the diffuser to the cross-sectional area of the diffuser at exit from the diffuser is less than 3.5.

7. The diffuser according to claim 2, wherein the outer annular wall is conical and the inner annular wall is generally concave and curves toward the outer annular wall.

8. A gas turbine engine, comprising:
an inlet that admits a working fluid;
a compressor section that receives the working fluid and compresses the working fluid to produce a compressed working fluid;
a combustion section that receives the compressed working fluid, mixes a fuel with the compressed working fluid and combusts the mixture to produce a hot working fluid; and
a turbine section that expands the hot working fluid to extract mechanical energy in the form of shaft power having a diffuser portion comprising:
an inner annular wall defining sections of the diffuser, where the sections comprise a first section and a second section following the first section, wherein the rate of increase of the cross-sectional area of the diffuser using an outer annular wall as an outer boundary and the inner annular wall as an inner boundary in a direction of fluid flow is greater in the first section than it is in the second section; and
the outer annular wall coaxially aligned and surrounding the annular inner wall,
wherein the inner annular wall diverges away from an axis of the gas turbine engine.

9. A diffuser for diffusing an exhaust gas produced by a gas turbine engine, comprising:
an inner annular wall defining sections of the diffuser, where the sections comprise a first section and a second section following the first section, wherein the rate of increase of a cross-sectional area of the diffuser, which includes using an outer annular wall as an outer boundary and the inner annular wall as an inner boundary, in a direction of fluid flow is greater in the first section than it is in the second section; and
the outer annular wall coaxially aligned and surrounding the annular inner wall,
wherein the inner annular wall diverges away from an axis of the gas turbine engine,
wherein the diffuser diffuses the exhaust gas produced by the gas turbine engine, and
wherein in the second section, the outer and inner annular walls are essentially parallel.

10. A gas turbine engine, comprising:
an inlet that admits a working fluid;
a compressor section that receives the working fluid and compresses the working fluid to produce a compressed working fluid;
a combustion section that receives the compressed working fluid, mixes a fuel with the compressed working fluid and combusts the mixture to produce a hot working fluid; and
a turbine section that expands the hot working fluid to extract mechanical energy in the form of shaft power having a diffuser portion comprising:
an inner annular wall defining sections of the diffuser, where the sections comprise a first section and a second section following the first section, wherein the rate of increase of the cross-sectional area of the diffuser using an outer annular wall as an outer boundary and the inner annular wall as an inner boundary in a direction of fluid flow is greater in the first section than it is in the second section; and
the outer annular wall coaxially aligned and surrounding the annular inner wall,
wherein the inner annular wall diverges away from an axis of the gas turbine engine, and
wherein in the second section, the outer and inner annular walls are essentially parallel.

* * * * *